United States Patent
Lv et al.

(10) Patent No.: US 12,537,906 B2
(45) Date of Patent: Jan. 27, 2026

(54) VIDEO EFFECT PACKET GENERATION METHOD AND APPARATUS, DEVICE, AND STORAGE MEDIUM

(71) Applicant: BEIJING BYTEDANCE NETWORK TECHNOLOGY CO., LTD., Beijing (CN)

(72) Inventors: Yang Lv, Beijing (CN); Ruifeng Ma, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 60 days.

(21) Appl. No.: 18/717,987

(22) PCT Filed: Dec. 6, 2022

(86) PCT No.: PCT/CN2022/136778
§ 371 (c)(1),
(2) Date: Jun. 7, 2024

(87) PCT Pub. No.: WO2023/104007
PCT Pub. Date: Jun. 15, 2023

(65) Prior Publication Data
US 2025/0055954 A1    Feb. 13, 2025

(30) Foreign Application Priority Data
Dec. 10, 2021    (CN) .......................... 202111506367.7

(51) Int. Cl.
H04N 5/262    (2006.01)
(52) U.S. Cl.
CPC ................................ H04N 5/2621 (2013.01)

(58) Field of Classification Search
CPC ....... H04N 5/262; H04N 5/2621; H04N 5/265
See application file for complete search history.

(56) References Cited

U.S. PATENT DOCUMENTS 11,368,746 B2 *   6/2022   Xu ..................... H04N 21/4351
11,521,389 B2 *  12/2022   Xu ..................... G06F 18/2413
(Continued)

FOREIGN PATENT DOCUMENTS

CN    109064387 A    12/2018
CN    110225369 A     9/2019
(Continued)

OTHER PUBLICATIONS

International Patent Application No. PCT/CN2022/136778; Int'l Search Report; dated Feb. 24, 2023; 3 pages.

*Primary Examiner* — Antoinette T Spinks
(74) *Attorney, Agent, or Firm* — BakerHostetler

(57) ABSTRACT

The present disclosure provides video effect packet generation method and apparatus, device, and storage medium. The method of generating the video effects package includes: obtaining an effects control with an empty input in a general effects graph, and determining the effects control as a target effects control; obtaining effects information in the target effects control and switching to a script effects graph; creating, in the script effects graph and according to the creation operation triggered by the user, a getting control, a frame capture control, a selection control and a setting control, the getting control and the setting control corresponding to the effects information; connecting the getting control, the frame capture control, the selection control and the setting control in sequence to input the captured video frames to the target effects control to generate a video effects package.

20 Claims, 3 Drawing Sheets

(56) References Cited

U.S. PATENT DOCUMENTS

| | | | | |
|---|---|---|---|---|
| 12,020,358 B2* | 6/2024 | Goodrich | ................ | G06T 13/80 |
| 12,271,985 B2* | 4/2025 | Huang | ................... | G06T 11/60 |
| 2009/0141024 A1* | 6/2009 | Lee | ..................... | H04N 21/816 |
| | | | | 345/420 |
| 2009/0154833 A1* | 6/2009 | Sakaue | ............... | H04N 1/2112 |
| | | | | 382/282 |
| 2020/0201693 A1* | 6/2020 | Jobi | ....................... | G06F 9/545 |
| 2020/0285858 A1* | 9/2020 | Xu | ....................... | G06V 40/165 |
| 2020/0329272 A1* | 10/2020 | Xu | ....................... | G11B 27/031 |
| 2021/0266650 A1 | 8/2021 | Beck et al. | | |
| 2022/0417591 A1* | 12/2022 | Xiao | ................... | G11B 27/031 |
| 2023/0136013 A1* | 5/2023 | Goodrich | ................ | G06T 13/40 |
| | | | | 345/419 |
| 2023/0215065 A1* | 7/2023 | Huang | ................... | G06T 11/60 |
| | | | | 345/619 |

FOREIGN PATENT DOCUMENTS

| | | |
|---|---|---|
| CN | 110378986 A | 10/2019 |
| CN | 112312631 A | 2/2021 |
| CN | 112351203 A | 2/2021 |
| CN | 113225450 A | 8/2021 |
| CN | 113452929 A | 9/2021 |
| CN | 114187169 A | 3/2022 |
| CN | 114187170 A | 3/2022 |
| EP | 2797314 A2 | 10/2014 |
| WO | WO 2021/031733 A1 | 2/2021 |
| WO | WO 2021/047420 A1 | 3/2021 |
| WO | WO 2021/227907 A1 | 11/2021 |

* cited by examiner

ND APPARATUS, DEVICE, AND
VIDEO EFFECT PACKET GENERATION METHOD AND APPARATUS, DEVICE, AND STORAGE MEDIUM

CROSS REFERENCE TO RELATED APPLICATIONS

This present application is a U.S. National Stage Application of PCT Application Serial No. PCT/CN2022/136778, filed Dec. 6, 2022, which claims priority to the Chinese patent application with application No. 202111506367.7 filed with the China Patent Office on Dec. 10, 2021, which are incorporated herein by reference in their entireties.

FIELD

The present disclosure relates to the field of computer software technology, for example, to image effects package generation method and apparatus, device, and storage medium.

BACKGROUND

The generation of effects packages is mainly implemented by developers using computer language programming. This method cannot achieve batch generation of effects packages and is less efficient.

SUMMARY

The present disclosure provides a method, apparatus, device, and storage medium for generating video effects packages, where generation of effects packages is based on a node system. It improves the generation efficiency of effects packages.

In a first aspect, the present disclosure discloses a method for generating a video effects package, including:
  obtaining an effects control with an empty input in a general effects graph, and determining the effects control as the target effects control;
  obtaining the effects information in the target effects control and switching to a script effects graph;
  creating, in the script effects graph and according to a creation operation triggered by a user, a getting control, a frame capture control, a selection control and a setting control, the getting control and the setting control corresponding to the effects information;
  connecting the getting control, the frame capture control, the selection control and the setting control in sequence, to input the captured video frames as the empty input of the target effects control to generate a video effects package.

In a second aspect, the present disclosure also provides an apparatus for generating a video effects package, including:
  a target effects control determination module, configured to obtain an effects control with an empty input in the general effects graph as the target effects control;
  an effects information acquisition module, configured to obtain the effects information in the target effects control and switch to the script effects graph;
  a control creation module, configured to create, in the script effects graph and according to a creation operation triggered by a user, a getting control, a frame capture control, a selection control and a setting control, the getting control and the setting control corresponding to the effects information;
  a video effects package generation module, configured to connect the getting control, the frame capture control, the selection control and the setting control in sequence to input the captured video frames as the empty input of the target effects control to generate a video effects package.

In a third aspect, the present disclosure also provides an electronic device, which includes:
  one or more processor;
  a memory configured to store one or more programs;
  when the one or more programs are executed by the one or more processor, cause the one or more processor implement the above method for generating a video effects package.

In a fourth aspect, the present disclosure also provides a computer-readable medium on which a computer program is stored. When the program is executed by a processor, the above-mentioned method for generating a video effects package is implemented.

DETAILED DESCRIPTION OF EMBODIMENTS

Figure 1:
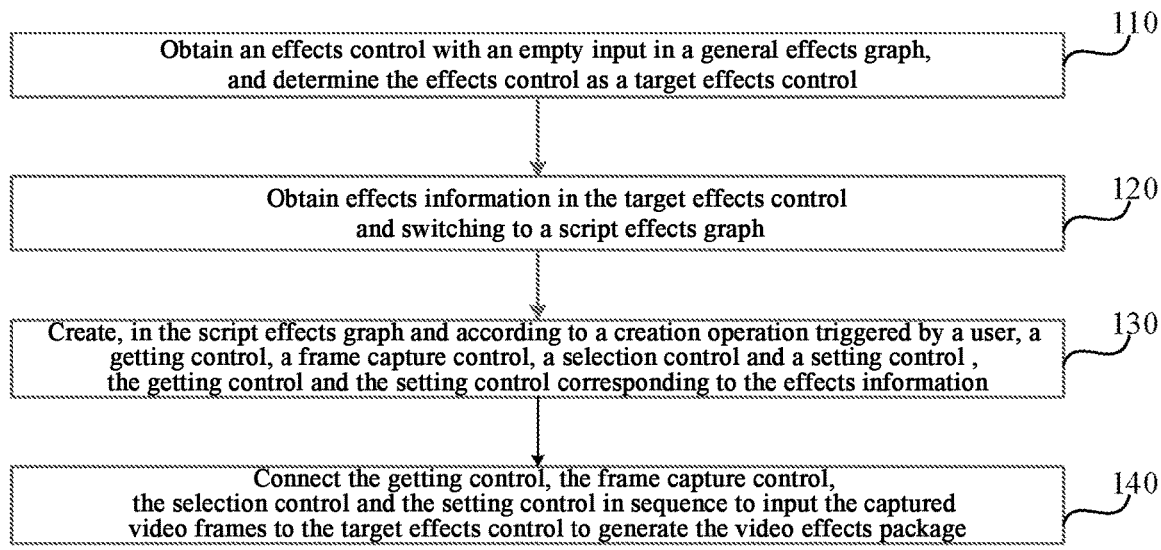
FIG. 1 is a flow chart of a method for generating a video effects package provided by an embodiment of the present disclosure.

Embodiments of the present disclosure will be described below with reference to the accompanying drawings. Although some embodiments of the disclosure are shown in the drawings, the disclosure may be embodied in various forms and these embodiments are provided for the understanding of the disclosure. The drawings and embodiments of the present disclosure are for illustrative purposes only.

Multiple steps described in the method implementations of the present disclosure may be executed in different orders and/or in parallel. Furthermore, method implementations may include additional steps and/or omit performance of illustrated steps. The scope of the present disclosure is not limited in this regard.

As used herein, the term "include" and its variations are open-ended, ie, "including but not limited to". The term "based on" means "based at least in part on". The term "one embodiment" means "at least one embodiment"; the term "another embodiment" means "at least one additional embodiment"; and the term "some embodiments" means "at least some embodiments". Relevant definitions of other terms will be given in the description below.

Concepts such as "first" and "second" mentioned in this disclosure are only used to distinguish different apparatus, modules or units, and are not used to limit the order or interdependence relation of the functions performed by these apparatus, modules or units.

The modifications of "one" and "plurality" mentioned in this disclosure are illustrative and not restrictive. Those skilled in the art will understand that it should be understood as "one or more" unless the context indicates otherwise, The names of messages or information exchanged between multiple apparatus in the embodiments of the present disclosure are for illustrative purposes only and are not used to limit the scope of these messages or information.

The general effects graph (Effect Graph) in the node system can perform effects processing on one or multiple pictures. Effect Graph includes core functional controls such as effects controls, video frame input controls, and scene output controls, as well as other extended function controls. This article mainly explains the working principle of the Effect Graph from the workflow of core functional controls.

Some video effects require the use of one previous frame directly or indirectly in the current frame, such as forming "illusion" effects or "freeze-frame" effects. In this embodiment, the functions of the script effects graph (Script Graph) and the general effects graph (Effect Graph) in the node system are combined to generate a frame capture effects package.

FIG. 1 is a flow chart of a method for generating a video effects package provided by an embodiment of the present disclosure. This embodiment can be applied to the situation of generating a video effects package based on a node system. This method can be executed by an apparatus for generating a video effects package. The apparatus can be composed of hardware and/or software, and can generally be integrated in a device with the function of generating a video effects package. The device can be an electronic device such as a server, a mobile terminal, or a server cluster. As shown in FIG. 1, the method includes the following steps:

Step 110: Obtaining an effects control with empty input in the general effects graph and determining the effects control as the target effects control.

Figure 2:
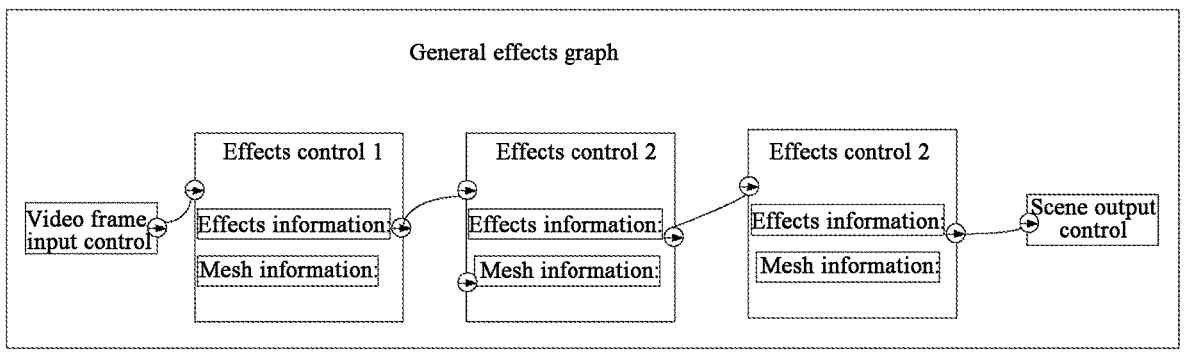
FIG. 2 is a connection example diagram of multiple functional controls in a general effects graph provided by an embodiment of the present disclosure.

The general effects graph includes a video frame input control, at least one effects control, and a scene output control, and the video frame input control, at least one effects control, and scene output control are connected according to set rules. As an example, FIG. 2 is an example diagram of the connection of multiple functional controls in a general effects graph provided by an embodiment of the present disclosure. As shown in FIG. 2, the general effects graph includes a video frame input control, three effects controls and scene output control, among which, the second effects control (effects control 2 in the figure) has an input that is empty, then effects control 2 is determined it as the target effects control.

Step 120: Obtaining the effect information in the target effects control and switching to the script effects graph.

The effects control carries effect information which indicates what kind of effects the effects control performs on the input video frames. Effect information is displayed through the effects information bar in the effects control, and users can get it intuitively. After obtaining the effects information, the current interface is switched to the script effects graph.

Step 130: Creating, in the script effects graph and according to the creation operation triggered by the user, a getting control, a frame capture control, a selection control and a setting control, the getting control and the setting control corresponding to the effects information.

The getting control is used to obtain the effect information of the target effects control from the resource graph; the frame capture control is used to cache multiple video frames; the selection control is used to select cached video frames; the setting control is used to input the selected video frames to the target effects control in order to merge with other input video frames of the target effects control.

In this embodiment, the process of creating, in the script effects graph, the getting control corresponding to the effects information according to the creation operation triggered by the user may be: obtaining the effects information from the resource graph; dragging the effects information into the script effects graph based on a drag operation of the user, and receives the acquisition options selected by the user to generate the getting control corresponding to the effect information.

Figure 3:
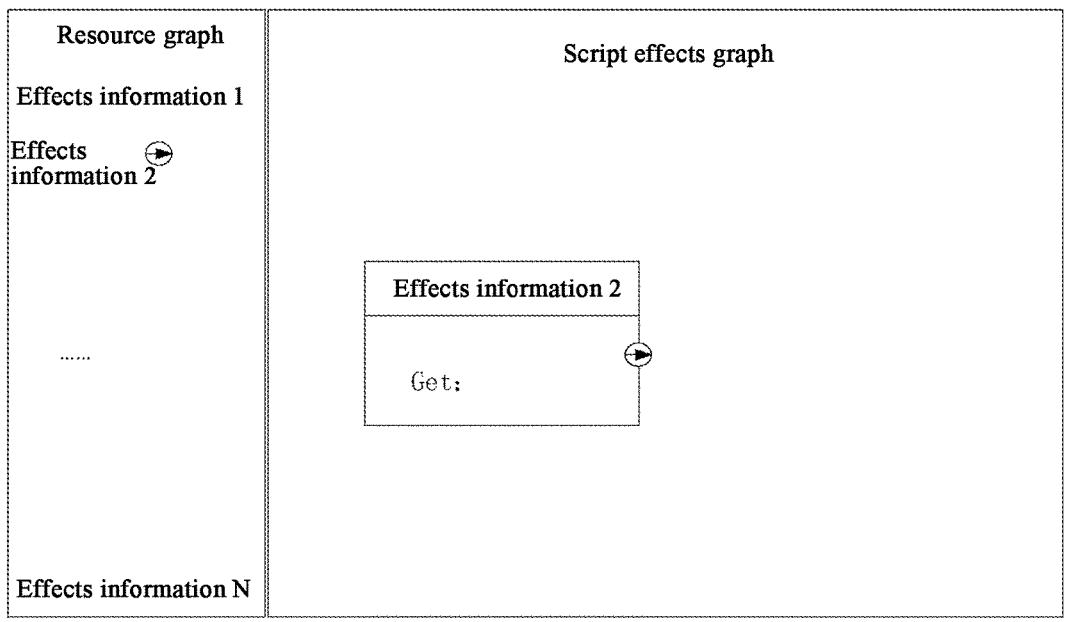
FIG. 3 is an example diagram of generating a getting control provided by an embodiment of the present disclosure.

The resource graph contains a variety of effects information. Users can select the required effects information from the resource graph, drag the effects information into the effects script graph, and select the "Get" option to generate the getting control corresponding to the effects information. As an example, FIG. 3 is an example diagram of generating a getting control provided by an embodiment of the present disclosure. As shown in FIG. 3, assuming that the required effect information is "Effect Information 2", the user drags the effect information 2 into the script effects graph and selects the "Get" option to obtain the getting control of the effect information 2.

In this embodiment, the process of creating a frame capture control based on a user-triggered creation operation in the script effects graph may be: creating an initial frame capture control based on a creation operation triggered by the user in the script effects graph; receiving the number of captured video frames set by the user in the initial frame capture control to generate a frame capture control.

The number of captured video frames can be the number of video frames that can be cached by the frame capture control. Assuming that the number of video frames is set to 10, it means that the frame capture control can cache 10 video frames. After the 11th video frame is captured, the frame capture control deletes the first buffered video frame, thereby storing the 11th video frame.

In this embodiment, the method of creating a selection control in the script effects graph based on the user-triggered creation operation may be: creating an initial selection control in the script effects graph based on the user-triggered creation operation; receiving the target video frame selected from the captured video frames and set by the user in the initial selection control to generate a selection control.

The sequence number of the selected target video frame is less than or equal to the number of video frames set in the frame capture control in order to ensure that it is selected from the video frames cached in the frame capture control. As an example, based on the above example, assuming that the value set by the user is 3, it means that the video frame with serial number 3 is selected from the cached video frames as the target video frame.

In this embodiment, the process of creating the setting control corresponding to the effects information in the script effects graph according to the user-triggered creation operation can be: obtaining the effects information from the resource graph; dragging the effects information into the script effects graph based on the user's drag operation, and receiving the setting options selected by the user to generate setting controls corresponding to the effects information.

Figure 4:
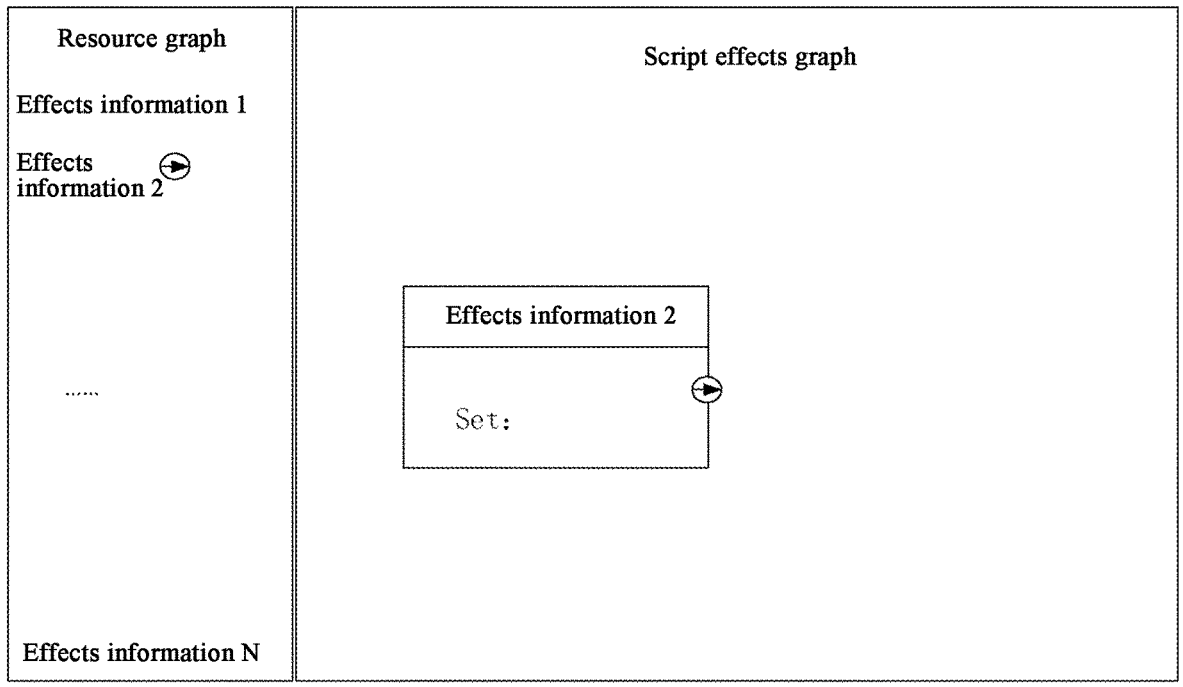
FIG. 4 is an example diagram of generating a setting control provided by an embodiment of the present disclosure.

The resource graph contains a variety of effects information. Users can select the required effects information from the resource graph, drag the effects information into the effects script graph, and select the "Settings" option in order to generate setting controls corresponding to the effects information. As an example, FIG. 4 is an example diagram of generating a setting control provided by an embodiment of the present disclosure. As shown in FIG. 4, assuming that the required effect information is "Effect Information 2", the user drags the effect information 2 into the script effects graph and selects the "Set" option to obtain the setting control of the effect information 2.

In one embodiment, after switching to the script effects graph, the following steps are also included: adding a trigger control in the script effects graph, and receiving the frame capture trigger conditions set by the user in the trigger control; connecting the output of the trigger control to the input of the frame capture control.

The frame capture triggering condition is to trigger the frame capture operation every N frames, N≥0. The output of the trigger control is connected to the input of the frame capture control in order to trigger the frame capture control to capture frames and cache them. As an example, assuming N=0, it means that every frame in the video should be captured. If N=1, it means that every other video frame is captured. The value of N can be set according to actual needs and is not limited here.

Step 140: Connecting the getting control, the frame capture control, the selection control and the setting control in sequence to input the captured video frames into the target effects control to generate a video effects package.

Figure 5:
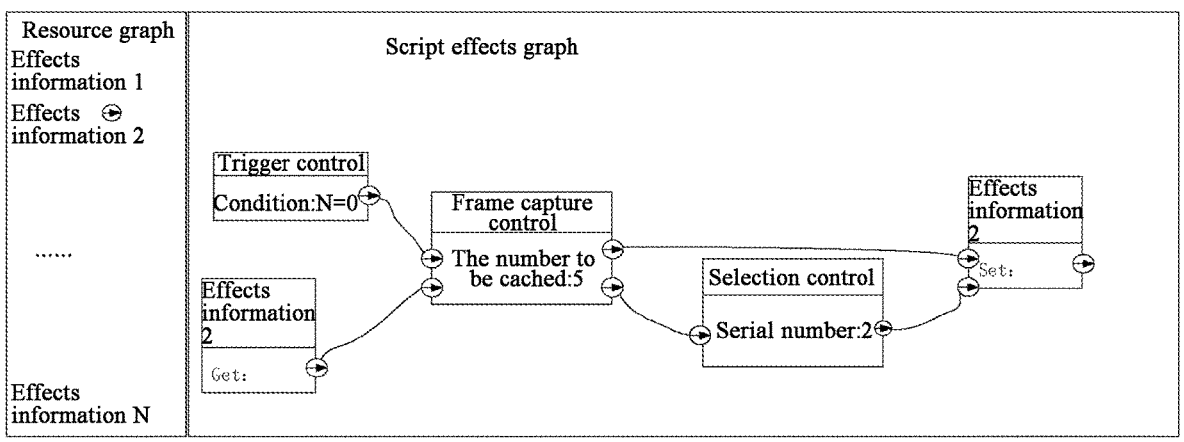
FIG. 5 is a connection diagram of multiple functional controls in a script effects graph provided by an embodiment of the present disclosure.

After the getting control, the frame capture control, the selection control and the setting control are created, the getting control, the frame capture control, the selection control and the setting control are connected in sequence. For example, FIG. 5 is a connection diagram of multiple functional controls in a script effects graph provided by an embodiment of the present disclosure. As shown in FIG. 5, it includes, from left to right, the getting control corresponding to the effect information 2, the trigger control, the frame capture control, the selection control and the setting control corresponding to the effect information 2. Among them, the trigger condition in the trigger control is to capture each frame, the number of video frames set in the frame capture control is 5, and the selection control is configured to select the video frame with serial number 2. As can be seen from FIG. 5, the frame capture control is connected to the setting control, and the function of this channel is to trigger.

In one embodiment, before obtaining a effects control with an empty input in the general effects graph, the following steps are also included: creating video frame input controls, at least one effects control, and scene output controls based on the creation operation triggered by the user in the general effects graph; selecting one of the effect controls as the target effect control and setting at least two inputs for the target effect control; selecting one of the effects controls as the target effects control, and setting at least two inputs to the target effects control; based on the user's trigger connection operation, connecting the video frame input control, at least one effects control, and the scene output control in sequence according to the set rules, and leaving one input of the target effects control empty.

The effects control carries effect information and mesh information. The video frame input control is used to input video frames to utilize subsequent effects processing. Video frame input controls can include built-in video frame input controls and static video frame input controls. The built-in video frame input control can input video frames collected by the camera of the current terminal device, and the static video frame input control can input videos that have been stored in the terminal device. The function of the effects control can add effects to the input pictures. Effects information and mesh information can be set in the effects control. The effects information can be the effects (such as mirroring processing, denoising processing, etc.) added by the effects control to the video frame to be processed. The mesh information can be the size and position of the effects added in the video frame to be processed by the effects control. The mesh information can include mesh vertex coordinates and normal information, etc. For example, the mesh information can be a full-screen quadrilateral, which indicates effects processing for the entire image. The scene output control is used to display the video frames that have been processed by the effects.

In this embodiment, in order to implement the frame capture effect, one of the effects controls is selected as the target effects control, at least two inputs are set to the target effects control, and one input of the target effects control is left empty, so that the input of the empty input is set by the script effects graph. The setting process can be referred to the above embodiment and will not be described again here.

The technical solution of the embodiment of the present disclosure is to obtain a effects control with an empty input in the general effects graph and determine it as the target effects control; obtain the effect information in the target effects control, and switch to the script effects graph; creating a getting control corresponding to the effects information, a frame capture control, a selection control and a setting control corresponding to the effects information in the script effects graph according to the creation operation triggered by the user; connecting the getting control, the frame capture control, the selection control and the setting control in sequence in order to input the video frames that have been captured to the target effects control to generate video effects package. The method for generating video effects packages provided by embodiments of the present disclosure can generate frame capture effects packages based on a node system, thereby improving the efficiency of generation of effects packages.

Figure 6:
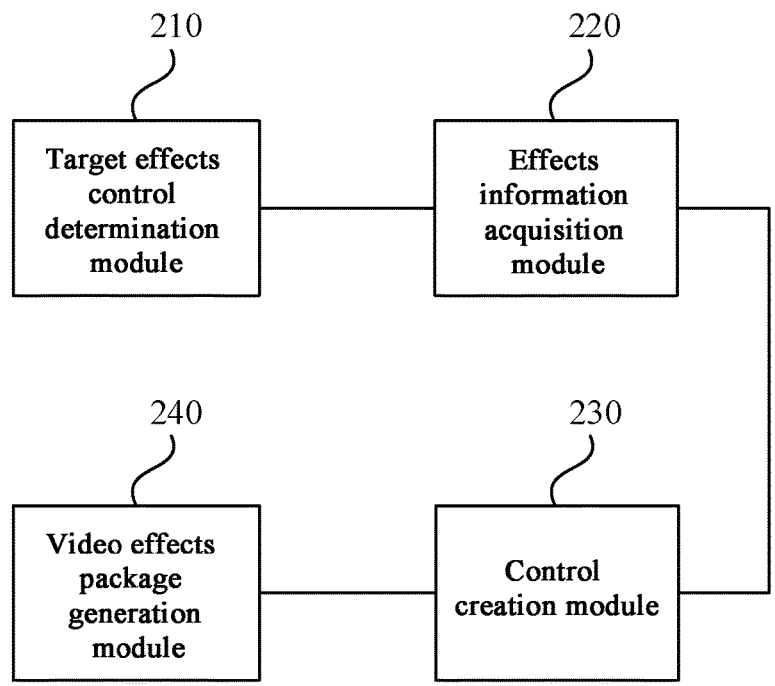
FIG. 6 is a schematic structural diagram of an apparatus for generating a video effects package provided by an embodiment of the present disclosure.

FIG. 6 is a schematic structural diagram of an apparatus for generating a video effects package provided by an embodiment of the present disclosure. As shown in FIG. 6, the apparatus includes:

a target effects control determination module 210 configured to obtain a effects control with an empty input in the general effects graph as the target effects control; a effects information acquisition module 220 configured to obtain the effects information in the target effects control and switch to the script effects graph; a control creation module 230 configured to create, in the script effects graph and according to the creation operation triggered by the user, a getting control, a frame capture control, a selection control and a setting control, the getting control and the setting control corresponding to the effects information; a video effects package generation module 240 configured to connect the getting control, the frame capture control, the selection control and the setting control in sequence to input the captured video frames to the target effects control to generate a video effects package.

In one embodiment, the control creation module 230 is configured to:
  obtain effects information from the resource graph; drag the effects information into the script effects graph based on a drag operation of a user, receive the acquisition options selected by the user, and generate a getting control corresponding to the effects information.

In one embodiment, the control creation module 230 is configured to:

create an initial frame capture control in the script effects graph based on the creation operation triggered by the user; receive the number of captured video frames set by the user in the initial frame capture control to generate a frame capture control.

In one embodiment, the control creation module 230 is configured to:

create an initial selection control in the script effects graph based on the creation operation triggered by the user; receive the target video frame selected from the captured video frames and set by the user in the initial selection control to generate the selection control.

In one embodiment, the control creation module 230 is configured to:

obtain effects information from the resource graph; drag the effects information into the script effects graph based on the drag operation of the user, receive the setting options selected by the user to generate setting controls corresponding to the effects information.

In one embodiment, it further includes: a trigger control adding module, configured to:

add a trigger control in the script effects graph and receive the frame capture trigger conditions set by the user in the trigger control; wherein the frame capture trigger condition is to trigger the frame capture operation every N frames, N≥0; connect the output of the trigger control with the input of the frame capture control.

In one embodiment, it further includes: a general effects graph control connection module, configured to:

create a video frame input control, at least one effects control, and a scene output control in the general effects graph based on the creation operation triggered by the user; wherein the effects control carries effect information; one of the effects controls is selected as the target effects control, and at least two inputs are set to the target effects control; the video frame input control, at least one effects control and the scene output control are connected in sequence according to the set rules based on the user's trigger connection operation, and one input of the target effects control is left empty.

The above-mentioned device can execute the methods provided by all the foregoing embodiments of the present disclosure, and has corresponding functional modules and effects for executing the above-mentioned methods. Technical details that are not described in detail in this embodiment can be referred to the methods provided by all the previous embodiments of this disclosure.

Figure 7:
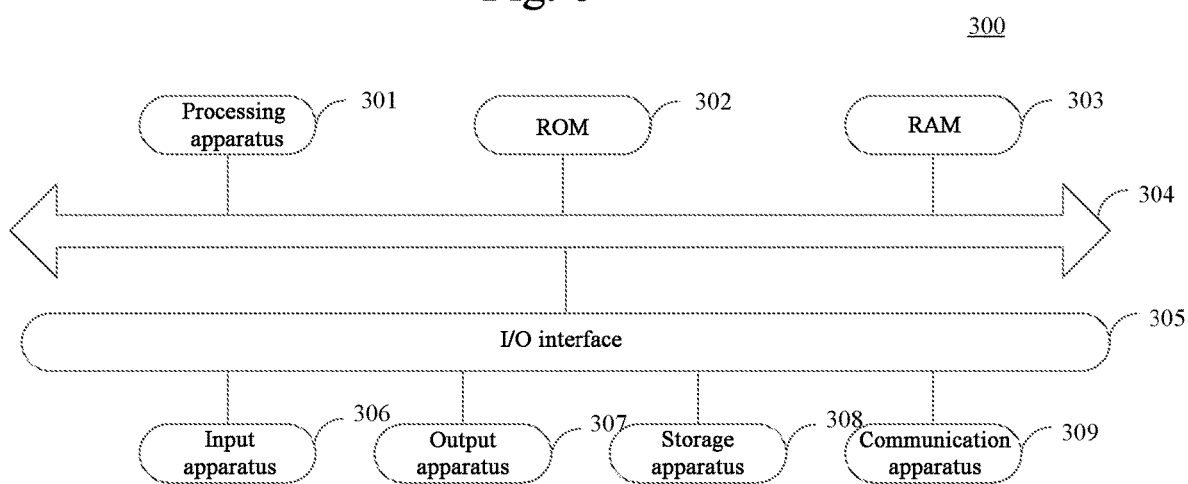
FIG. 7 is a schematic structural diagram of an electronic device provided by an embodiment of the present disclosure.

Referring now to FIG. 7, a schematic structural diagram of an electronic device 300 suitable for implementing embodiments of the present disclosure is shown. Electronic devices in embodiments of the present disclosure may include, but are not limited to, mobile phones, notebook computers, digital broadcast receivers, personal digital assistants (Personal Digital Assistant, PDA), tablet computers (Portable Android Device, PAD), portable multimedia players Mobile terminals such as (Portable Media Player, PMP), vehicle-mounted terminals (such as vehicle-mounted navigation terminals), and fixed terminals such as digital TV (TV), desktop computers, etc., or various forms of servers, such as independent servers or server cluster. The electronic device 300 shown in FIG. 7 is only an example and should not bring any limitations to the functions and usage scope of the embodiments of the present disclosure.

As shown in FIG. 7, the electronic device 300 may include a processing apparatus (such as a central processing unit, a graphics processor, etc.) 301, which may be configured to perform various appropriate actions and processes according to a program stored in a read-only memory (Read-Only Memory, ROM) 302 or a program loaded from a storage apparatus 308 to the random access memory device (Random Access Memory, RAM) 303. In the RAM 303, various programs and data required for the operation of the electronic device 300 are also stored. The processing apparatus 301, the ROM 302 and the RAM 303 are connected to each other via a bus 304. An input/output (I/O) interface 305 is also connected to bus 304.

Generally, the following apparatus can be connected to the I/O interface 305: an input apparatus 306 including, for example, a touch screen, touch pad, keyboard, mouse, camera, microphone, accelerometer, gyroscope, etc.; an output apparatus 307 including, for example, a Liquid Crystal Display (LCD), a speaker, a vibrator, etc.; a storage apparatus 308 including a magnetic tape, a hard disk, etc.; and a communication apparatus 309. The communication apparatus 309 may allow the electronic device 300 to communicate wirelessly or wirily with other devices to exchange data. Although FIG. 7 illustrates electronic device 300 with various apparatus, implementation or availability of all illustrated apparatus is not required. More or fewer apparatus may alternatively be implemented or provided.

According to embodiments of the present disclosure, the processes described above with reference to the flowcharts may be implemented as a computer software program. For example, embodiments of the present disclosure include a computer program product which comprises a computer program carried on a computer-readable medium, the computer program including program code for executing a method for generating a video effects package. In such embodiments, the computer program may be downloaded and installed from the network via communication apparatus 309, or from storage apparatus 308, or from ROM 302. When the computer program is executed by the processing apparatus 301, the above-mentioned functions defined in the method of the embodiment of the present disclosure are performed.

The computer-readable medium mentioned above in the present disclosure may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. Examples of computer-readable storage media may include, but are not limited to: electrical connections having one or more wires, portable computer disks, hard drives, RAM, ROM, Erasable Programmable Read-Only Memory (Erasable Programmable Read-Only Memory, EPROM or flash memory), optical fiber, portable compact disk read-only memory (Compact Disc Read-Only Memory, CD-ROM), optical storage device, magnetic storage device, or any suitable combination of the above. In this disclosure, a computer-readable storage medium may be any tangible medium that contains or stores a program for use by or in connection with an instruction execution system, apparatus, or device. In the present disclosure, a computer-readable signal medium may include a data signal propagated in baseband or as part of a carrier wave, carrying computer-readable program code therein. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program code contained on a computer-readable medium can be transmitted using any appropriate medium, including but not limited to: wires, optical cables, radio frequency (Radio Frequency, RF), etc., or any suitable combination of the above.

In some implementations, the client and server can communicate using any currently known or future developed network protocol, such as HyperText Transfer Protocol (HTTP), and can be interconnected with any form or medium of digital data communication (such as communication networks). Examples of communication networks include Local Area Networks (Local Area Network, LANs), Wide Area Networks (Wide Area Networks, WANs), the Internet (e.g., the Internet), and end-to-end networks (e.g., ad hoc end-to-end networks), as well as any current network for knowledge or future research and development.

The above-mentioned computer-readable medium may be included in the above-mentioned electronic device; it may also exist independently without being assembled into the electronic device.

The above-mentioned computer-readable medium carries one or more programs. When the above-mentioned one or more programs are executed by the electronic device, cause the electronic device to: obtain a effects control with an empty input in the general effects graph and determines it as the target effect control; obtain the effect information in the target effects control, and switch to the script effects graph; creating a getting control corresponding to the effects information, a frame capture control, a selection control and a setting control corresponding to the effects information in the script effects graph according to the creation operation triggered by the user; connect the getting control, the frame capture control, the selection control and the setting control in sequence in order to input the video frames that have been captured to the target effects control to generate video effects package.

Computer program code for performing the operations of the present disclosure may be written in one or more programming languages or the combination thereof, including but not limited to object-oriented programming languages-such as Java, Smalltalk, C++, and also including conventional procedural programming languages-such as "C" or similar programming languages. The program code may execute entirely on the user's computer, partly on the user's computer, as a stand-alone software package, partly on the user's computer and partly on a remote computer or entirely on the remote computer or server. In situations involving remote computers, the remote computer may be connected to the user's computer through any kind of network, including a LAN or WAN, or may be connected to an external computer (such as through the Internet using an Internet service provider).

The flowcharts and block diagrams in the figures illustrate the architecture, functionality, and operations of possible implementations of systems, methods, and computer program products according to various embodiments of the present disclosure. In this regard, each block in the flowchart or block diagram may represent a module, segment, or portion of code that contains one or more logic functions that implement the specified executable instructions. It should also be noted that, in some alternative implementations, the functions noted in the block may occur out of the order noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented by special purpose hardware-based systems that perform the specified functions or operations, or can be implemented using a combination of specialized hardware and computer instructions.

The units involved in the embodiments of the present disclosure can be implemented in software or hardware. Among them, the name of a unit does not constitute a limitation on the unit itself.

The functions described above herein may be performed, at least in part, by one or more hardware logic components. For example, without limitation, exemplary types of hardware logic components that can be used include: field programmable gate array (Field Programmable Gate Array, FPGA), application specific integrated circuit (Application Specific Integrated Circuit, ASIC), application specific standard product (Application Specific Standard Parts (ASSP), System on Chip (System on Chip, SOC), Complex Programming Logic Device (Complex Programming Logic Device, CPLD), etc.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, apparatus or devices, or any suitable combination of the foregoing. Examples of machine-readable storage media would include an electrical connection based on one or more wires, a portable computer disk, a hard drive, RAM, ROM, EPROM or flash memory, optical fiber, CD-ROM, optical storage device, magnetic storage device, or any suitable combination of the above.

According to one or more embodiments of the present disclosure, the present disclosure discloses a method for generating a video effects package, including: obtaining a effects control with an empty input in a general effects graph, and determining the effects control as a target effects control;
   obtaining the effects information in the target effects control and switching to a script effects graph;
   creating, in the script effects graph and according to a creation operation triggered by a user, a getting control, a frame capture control, a selection control and a setting control, the getting control and the setting control corresponding to the effects information;
   connecting the getting control, the frame capture control, the selection control and the setting control in sequence to input the captured video frames to the target effects control to generate a video effects package.

According to one or more embodiments of the present disclosure, creating, in the script effects graph and according to the creation operation triggered by the user, a getting control corresponding to the effects information includes:
   obtaining effects information from the resource graph;
   dragging the effects information into the script effects graph based on a drag operation of a user, receiving the getting options selected by the user to generate a getting control corresponding to the effects information.

According to one or more embodiments of the present disclosure, creating, in the script effects graph and according to the creation operation triggered by the user, a frame capture control includes:

creating an initial frame capture control in the script effects graph based on the creation operation triggered by the user;

generating the frame capture control by receiving the number of captured video frames set by the user in the initial frame capture control.

According to one or more embodiments of the present disclosure, creating, in the script effects graph and according to the creation operation triggered by the user, a selection control includes:

creating an initial selection control in the script effects graph based on the creation operation triggered by the user;

generating the selection control by receiving the target video frame selected from the captured video frames and set by the user in the initial selection control.

According to one or more embodiments of the present disclosure, creating, in the script effects graph and according to the creation operation triggered by the user, a setting control corresponding to the effect information includes:

obtaining effects information from the resource graph;

dragging the effects information into the script effects graph based on the user's drag operation, receiving the setting options selected by the user to generate setting controls corresponding to the effects information.

According to one or more embodiments of the present disclosure, after switching to the script effects graph, the method further includes:

adding a trigger control in the script effects graph and receive the frame capture trigger conditions set by the user in the trigger control; wherein the frame capture trigger condition is to trigger the frame capture operation every N frames, N≥0;

connecting the output of the trigger control with the input of the frame capture control.

According to one or more embodiments of the present disclosure, before obtaining an effect control with an empty input in the general effects graph, the method further includes:

creating a video frame input control, at least one effects control, and a scene output control in the general effects graph based on the creation operation triggered by the user; wherein the effects control carries the effect information;

selecting one of the effects controls as the target effects control, and set at least two inputs to the target effects control;

connecting the video frame input control, the at least one effects control and the scene output control in sequence according to the set rules based on the trigger connection operation of the user, and leaving one input of the target effects control empty.

What is claimed:

1. A method for generating a video effects package, comprising:

obtaining an effects control with an empty input in a general effects graph, and determining the effects control as a target effects control;

obtaining effects information in the target effects control and switching to a script effects graph;

creating, in the script effects graph and according to a creation operation triggered by a user, a getting control, a frame capture control, a selection control, and a setting control, the getting control and the setting control corresponding to the effects information; and connecting the getting control, the frame capture control, the selection control, and the setting control in sequence to input captured video frames to the target effects control, to generate the video effects package.

2. The method according to claim 1, wherein creating, in the script effects graph and according to the creation operation triggered by the user, the getting control corresponding to the effects information comprises:

obtaining the effects information from a resource graph;

dragging the effects information into the script effects graph based on a drag operation of the user; and receiving a getting option selected by the user to generate the getting control corresponding to the effects information.

3. The method according to claim 1, wherein creating, in the script effects graph and according to the creation operation triggered by the user, the frame capture control comprises:

creating an initial frame capture control in the script effects graph according to the creation operation triggered by the user; and generating the frame capture control by receiving a number of captured video frames set by the user in the initial frame capture control.

4. The method according to claim 3, wherein creating, in the script effects graph and according to the creation operation triggered by the user, a selection control comprises:

creating an initial selection control in the script effects graph according to the creation operation triggered by the user; and generating the selection control by receiving a target video frame set by the user in the initial selection control, the target video frame being selected from the captured video frames.

5. The method according to claim 1, wherein creating, in the script effects graph and according to the creation operation triggered by the user, a setting control corresponding to the effects information comprises:

obtaining the effects information from a resource graph;

dragging the effects information into the script effects graph based on a drag operation of the user; and receiving a setting option selected by the user to generate the setting control corresponding to the effects information.

6. The method according to claim 1, after the switching to the script effects graph, the method further comprising:

adding a trigger control in the script effects graph and receiving a frame capture trigger condition set by the user in the trigger control, wherein the frame capture trigger condition is to trigger a frame capture operation every N frames, N≥0; and connecting output of the trigger control with input of the frame capture control.

7. The method according to claim 1, before the obtaining the effects control with the empty input in the general effects graph, the method further comprising:

creating, in the general effects graph, a video frame input control, at least one effects control, and a scene output control according to the creation operation triggered by the user, wherein the effects control carries the effects information;

selecting one of the effects controls as the target effects control, and setting at least two inputs to the target effects control; and connecting the video frame input control, the at least one effects control, and the scene output control in sequence according to set rules based on a connection operation triggered by the user, and leaving one input of the target effects control empty.

8. An electronic device, comprising:

at least one processor;

a memory storing at least one program which, when executed by the at least one processor, causes the at least one processor to perform operations comprising:

obtaining an effects control with an empty input in a general effects graph, and determining the effects control as a target effects control;

obtaining effects information in the target effects control and switching to a script effects graph;

creating, in the script effects graph and according to a creation operation triggered by a user, a getting control, a frame capture control, a selection control, and a setting control, the getting control and the setting control corresponding to the effects information; and connecting the getting control, the frame capture control, the selection control, and the setting control in sequence to input captured video frames to the target effects control, to generate the video effects package.

9. The electronic device according to claim 8, wherein creating and according to the creation operation triggered by the user, in the script effects graph, the getting control corresponding to the effects information comprises:

obtaining the effects information from a resource graph;

dragging the effects information into the script effects graph based on a drag operation of the user; and receiving a getting option selected by the user to generate the getting control corresponding to the effects information.

10. The electronic device according to claim 8, wherein creating, in the script effects graph and according to the creation operation triggered by the user, the frame capture control comprises:

creating an initial frame capture control in the script effects graph according to the creation operation triggered by the user; and generating the frame capture control by receiving a number of captured video frames set by the user in the initial frame capture control.

11. The electronic device according to claim 10, wherein creating, in the script effects graph and according to the creation operation triggered by the user, a selection control comprises:

creating an initial selection control in the script effects graph according to the creation operation triggered by the user; and generating the selection control by receiving a target video frame set by the user in the initial selection control, the target video frame being selected from the captured video frames.

12. The electronic device according to claim 8, wherein creating, in the script effects graph and according to the creation operation triggered by the user, a setting control corresponding to the effects information comprises:

obtaining the effects information from a resource graph;

dragging the effects information into the script effects graph based on a drag operation of the user; and receiving a setting option selected by the user to generate the setting control corresponding to the effects information.

13. The electronic device according to claim 8, after the switching to the script effects graph, the operations further comprising:

adding a trigger control in the script effects graph and receiving a frame capture trigger condition set by the user in the trigger control, wherein the frame capture trigger condition is to trigger a frame capture operation every N frames, N≥0; and connecting output of the trigger control with input of the frame capture control.

14. The electronic device according to claim 8, before the obtaining the effects control with the empty input in the general effects graph, the operations further comprising:

creating, in the general effects graph, a video frame input control, at least one effects control, and a scene output control according to the creation operation triggered by the user, wherein the effects control carries the effects information;

selecting one of the effects controls as the target effects control, and setting at least two inputs to the target effects control; and connecting the video frame input control, the at least one effects control, and the scene output control in sequence according to set rules based on a connection operation triggered by the user, and leaving one input of the target effects control empty.

15. A non-transitory computer-readable medium storing a computer program which, when executed by a processor, causes the processor to perform operations comprising:

obtaining an effects control with an empty input in a general effects graph, and determining the effects control as a target effects control;

obtaining effects information in the target effects control and switching to a script effects graph;

creating, in the script effects graph and according to a creation operation triggered by a user, a getting control, a frame capture control, a selection control, and a setting control, the getting control and the setting control corresponding to the effects information; and connecting the getting control, the frame capture control, the selection control, and the setting control in sequence to input captured video frames to the target effects control, to generate the video effects package.

16. The non-transitory computer-readable medium according to claim 15, wherein creating, in the script effects graph and according to the creation operation triggered by the user, the getting control corresponding to the effects information comprises:

obtaining the effects information from a resource graph;

dragging the effects information into the script effects graph based on a drag operation of the user; and receiving a getting option selected by the user to generate the getting control corresponding to the effects information.

17. The non-transitory computer-readable medium according to claim 15, wherein creating, in the script effects graph and according to the creation operation triggered by the user, the frame capture control comprises:

creating an initial frame capture control in the script effects graph according to the creation operation triggered by the user; and generating the frame capture control by receiving a number of captured video frames set by the user in the initial frame capture control.

18. The non-transitory computer-readable medium according to claim 17, wherein creating, in the script effects graph and according to the creation operation triggered by the user, a selection control comprises:
- creating an initial selection control in the script effects graph according to the creation operation triggered by the user; and
- generating the selection control by receiving a target video frame set by the user in the initial selection control, the target video frame being selected from the captured video frames.

19. The non-transitory computer-readable medium according to claim 15, wherein creating, in the script effects graph and according to the creation operation triggered by the user, a setting control corresponding to the effects information comprises:
- obtaining the effects information from a resource graph;
- dragging the effects information into the script effects graph based on a drag operation of the user; and
- receiving a setting option selected by the user to generate the setting control corresponding to the effects information.

20. The non-transitory computer-readable medium according to claim 15, after the switching to the script effects graph, the operations further comprising:
- adding a trigger control in the script effects graph and receiving a frame capture trigger condition set by the user in the trigger control, wherein the frame capture trigger condition is to trigger a frame capture operation every N frames, $N \geq 0$; and
- connecting output of the trigger control with input of the frame capture control.

* * * * *